J. WILEY.
Cotton Plow.
No. 110,411.
Patented Dec. 20, 1870.
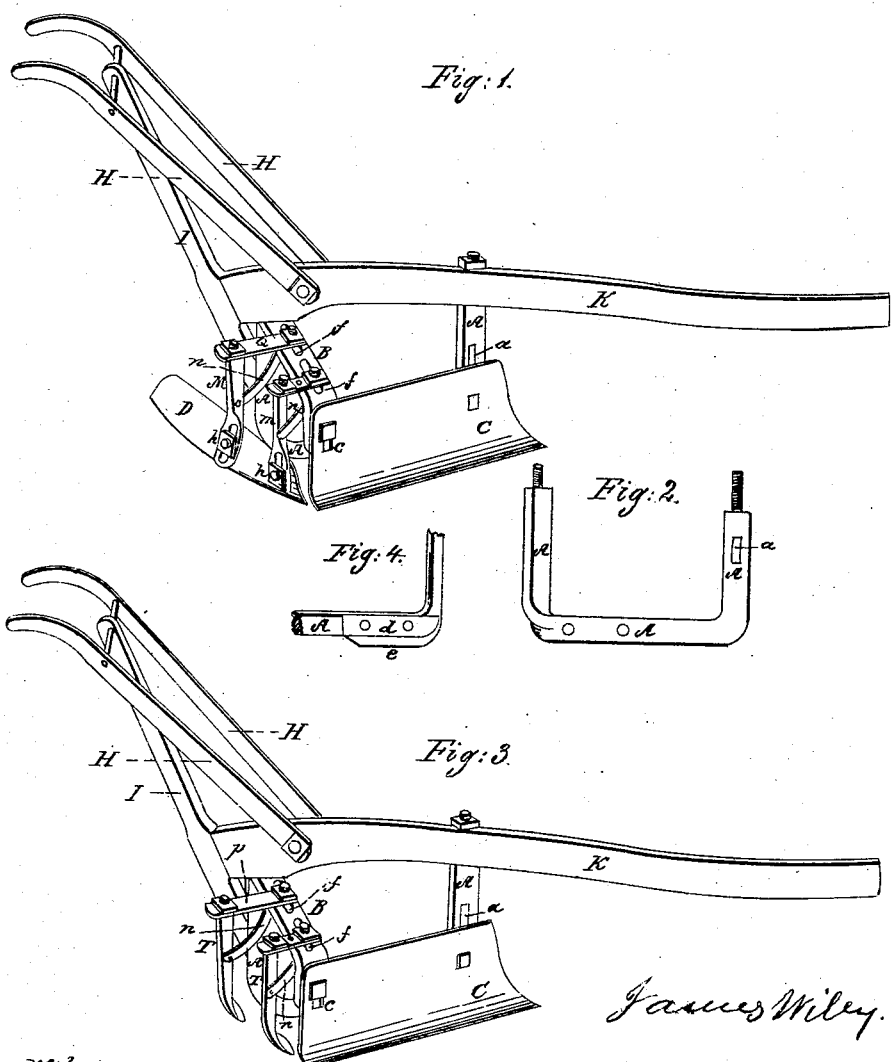

UNITED STATES PATENT OFFICE.

JAMES WILEY, OF WARSAW, NORTH CAROLINA.

IMPROVEMENT IN COTTON-PLOWS.

Specification forming part of Letters Patent No. 110,411, dated December 20, 1870.

I, JAMES WILEY, of Warsaw, Duplin county, and State of North Carolina, have invented certain new and useful Improvements in Plows for the Cultivation of Cotton and other Plants, of which the following is a specification:

The first part of my invention relates to the construction of the metal frame-work to which the wooden handles and beam are attached, as well as the operative parts, hereinafter described.

The second part of my invention relates to the form and operation of the scraper, which is somewhat similar in form to the common mold-board of ordinary plows, and is designed to be made thin and sharp, and to merely skim the surface of the soil between the rows of plants, cutting away the grass and weeds while they are young and tender, and throwing them away from the plants and depositing them near the middle between the rows.

The third part of my invention relates to the construction and operation of a metallic plate attached to the metallic frame, and so formed and arranged that, while the said scraper removes the weeds and grass to the middle between the rows, it will drag or scrape the loose soil from near the middle and deposit the same near the row of plants.

The fourth part of my invention relates to the manner and means of substituting one or more teeth, like unto the teeth of the ordinary cultivator, for the sweep above described, so that the soil may be broken up to any desired depth by the teeth, instead of being drawn or thrown toward the row of plants, as before described.

A plow having my improvements may be used, under certain circumstances, with great advantage in the cultivation of corn, potatoes, and many other crops; but it is more especially adapted to the cultivation of the cotton-plant.

In the accompanying drawing, Figure 1 represents a perspective view of my plow, showing the general form and arrangement of parts. Fig. 2 shows a side elevation of the bar composing the part of the metal frame before mentioned. Fig. 3 shows a perspective view of the plow with the cultivator-teeth before mentioned introduced into the implement instead of the sweep aforesaid. Fig. 4 shows a section of the bar A with piece $d$.

The bar A is a simple flat bar of metal, bent into the form shown in Fig. 2, provided with a slot, $a$, and its forward upright portion twisted so as to present its flat side to the scraper C, to which it is fastened by means of the screw-bolt and nut, as shown, and by means of the slot $a$ the forward end of the scraper may be adjusted at any desired height. The forward end of the bar is reduced near the top to a round bolt, and passes through the beams and is fastened, as shown in Fig. 1. The other and rear end of that bar is bent upward and near the top, and reduced to the form of a round bolt, and passes through the cross-piece B, and thence up through the beam, and is fastened by a nut.

The cross-bar B extends out perpendicularly from the upright A, and is provided with slots $ff$, and the outer end is bent down at nearly a right angle, and is fastened adjustably to the scraper C by a screw-bolt and nut passing through the slot $c$, as shown. Thus the beam K, bar A, and scraper are securely fastened together, and the scraper is easily adjustable by means of the slots $a$ and $c$. The bar A, however, runs on its edge upon the ground, and might therefore rise or sink, according to the softness or hardness of the ground; and to prevent this result, and as a sort of guide to the plow, I bolt the piece $d$ on the inside of the bar. This piece has a flange, $e$, extending out a little more or less than at a right angle to the bar. Now, when the soil has been ridged up against the row of plants, this piece, when set at the proper angle downward, will serve to hold the plow in proper position and prevent its running into the row of plants, and it will always prevent the plow from sinking into soft ground. The sweep D is so formed and set at such an angle to the line of direction of the plow that it will drag the loose clean soil to the plants after the weeds and grass have been shaved off by the scraper. Its rear end will not approach so near the plants as the scraper, and its forward end will just come a little short of the windrow of grass and weeds deposited in the middle by the scraper.

It will be seen from the drawing that this sweep is fastened upon two upright bars, $m\ m$, by means of bolts and nuts passing through the slots $h\ h$ in the bars, and that its height is adjustable. These uprights are bolted to the bars p p, and both are rendered rigid by the braces n n, which are bolted at their lower ends to the uprights m m, while their upper ends pass through the cross-bar B, and thence through the bars p p, which are held down upon them by screw-nuts, as shown in the drawing.

If, however, it should be desired by the operator to break up the ground from which the weeds and grass shall have been skimmed by the scraper, in that case the sweep and its bars and braces may all be removed, and the teeth (T T, Fig. 3) be substituted in their places, with similar bars and braces, the teeth being made adjustable to the right or left on the cross-bar B by means of the slots f f.

Whether the teeth or the sweep shall be used in any case will depend upon the character of the soil, its condition as to wetness or dryness, and the age and condition of the plant to be cultivated.

It cannot fail to be observed how cheap, simple, and durable this plow is, nor how convenient and efficient it is. All the operative parts—the scraper, sweep, and teeth—are adjustable.

The handle-brace I, after receiving in its mortise a tenon on the end of the beam passing down, is bolted to the lower angle of the bar A, thus bracing the whole implement.

The peculiar forms of both the scraper and the sweep D, as shown in the drawing, are important in securing the operation described.

What I claim, and desire to secure by Letters Patent, is—

1. The metal bar A, bent and slotted as described, and having the flanged piece d, in combination with the cross-bar B and the scraper C, having the peculiar form and set described, and having the slot c, when each is constructed and all are arranged together substantially in the manner and for the purpose described.

2. The sweep D, with its bars, braces, nuts, and screws, in combination with the cross-bar B, when each and all are constructed and arranged substantially as described.

3. The slotted bar B, with its bars, bolts, and braces, when so constructed and arranged that the sweep D and the teeth T T can be used interchangeably in the plow, substantially in the manner and for the purposes described.

JAMES WILEY.

Witnesses:
J. R. BUCHANAN,
A. M. STOUT, Jr.